Aug. 18, 1936.  F. B. ERNST  2,051,595
TRUCK
Filed July 8, 1932  2 Sheets-Sheet 1
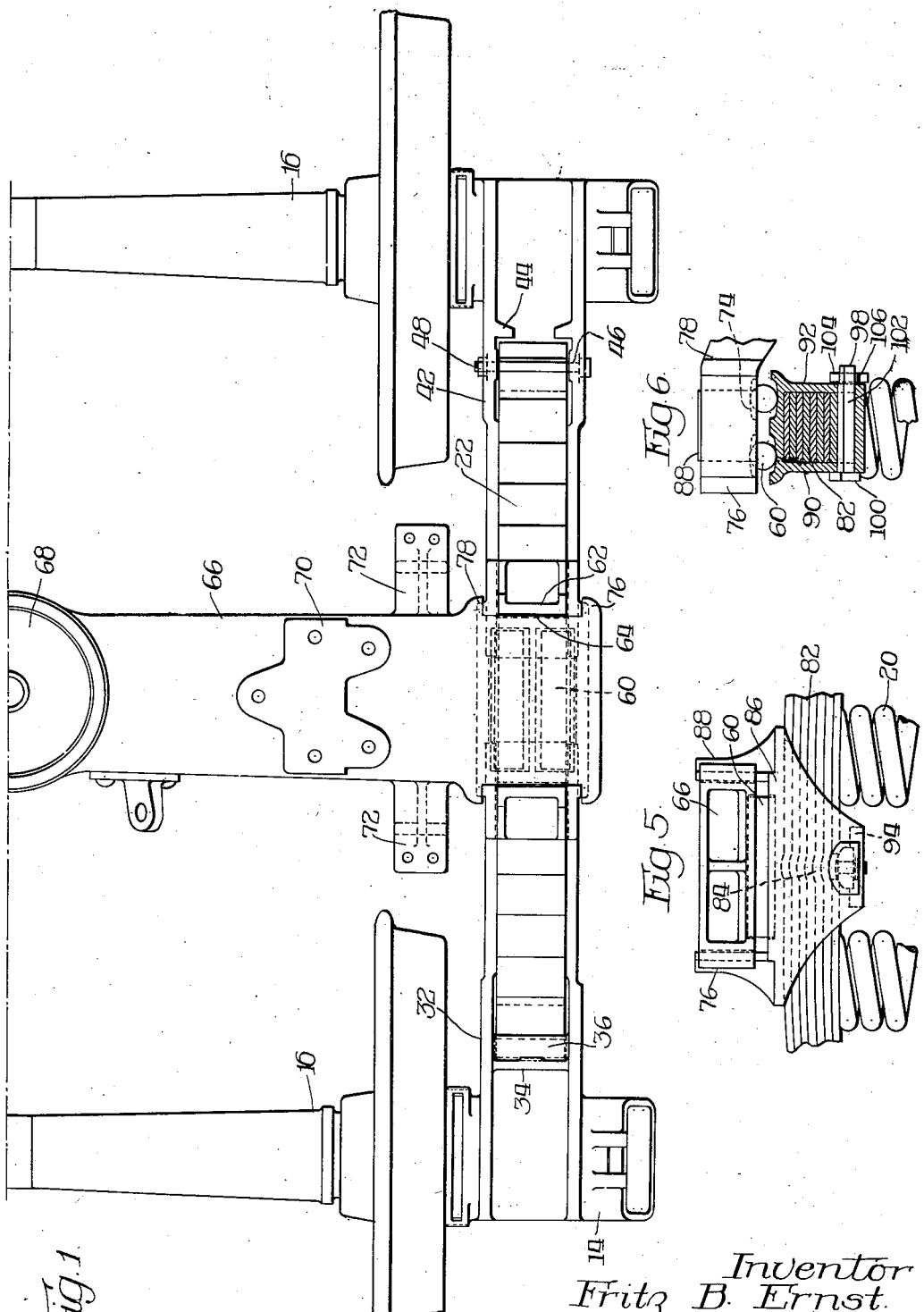
Inventor
Fritz B. Ernst.
By Wilkinson, Huxley, Byron & Knight
Attys Aug. 18, 1936.  F. B. ERNST  2,051,595
TRUCK
Filed July 8, 1932   2 Sheets-Sheet 2
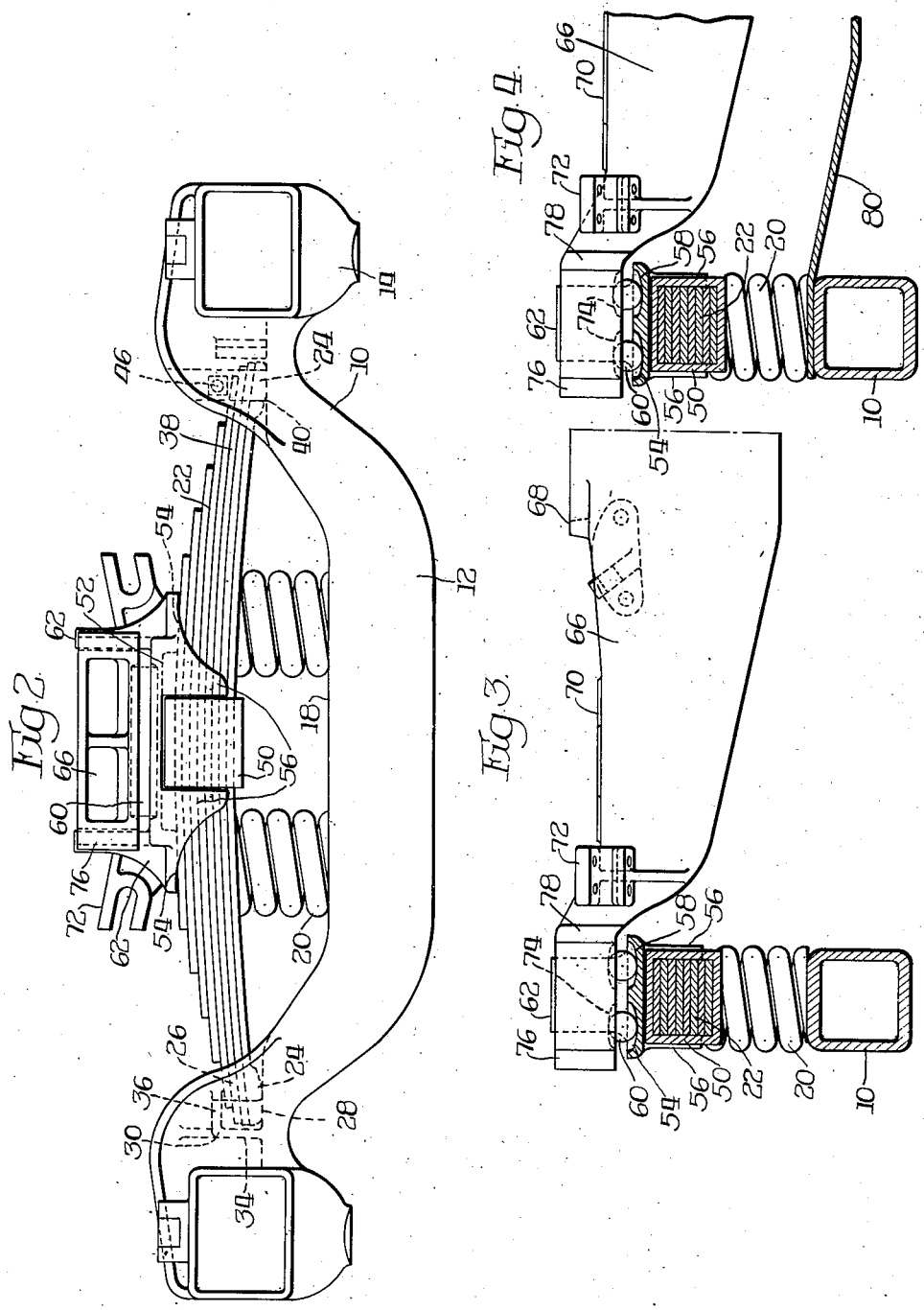
Inventor:
Fritz B. Ernst
By Wilkinson, Huxley, Byron & Knight
Attys Patented Aug. 18, 1936

2,051,595

UNITED STATES PATENT OFFICE 2,051,595

TRUCK

Fritz B. Ernst, Chicago, Ill., assignor to American Steel Foundries, Chicago, Ill., a corporation of New Jersey Application July 8, 1932, Serial No. 621,441

27 Claims. (Cl. 105—186)

This invention pertains to truck construction, and more particularly to four-wheel trucks adapted particularly for high speed freight car use.

Desirable features for freight car trucks are economy, simplicity, lightness, strength, and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response; leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives the good riding qualities it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

Yet a further object is to provide a laminated spring arrangement wherein the parts are positively and inherently prevented from dissociation or dislocation.

A different object is to provide a side frame construction of great strength, rigidity and simplicity of construction and design wherein provision is made to position spring members and transmit thrusts therefrom to the side frame.

A still different object is to provide a truck wherein the bolster is interlocked and adapted to be assembled with resilient supporting means.

Another different object is to provide a lateral motion truck wherein supporting resilient means is supported on a frame member in a pocket at one end and retained at the other.

With these and various other objects in view the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse fragmentary sectional elevation of the truck construction illustrated in Figure 2, the section being taken substantially in the plane of the transverse center line of said truck;

Figure 4 is a fragmentary sectional side elevation of the truck construction corresponding substantially to the construction shown in Figure 3, showing the application of a spring plank or transverse tie member thereto;

Figure 5 is a fragmentary side elevation of a modified form of truck construction embodying the invention;

Figure 6 is a transverse fragmentary sectional elevation of the truck construction shown in Figure 5, the section thereof being taken substantially in the plane of the transverse center line of the truck.

As each side of the truck is the same, only one side is described, the entire assembly of the truck being readily understood therefrom.

Referring first of all more particularly to the construction shown in Figures 1, 2 and 3, the side frame 10 comprises the substantially box-shaped beam member 12 provided with journal means, such as the journal boxes 14 having cooperative relation with the journal ends of the wheel and axle assemblies 16. The side frame is depressed intermediate the ends thereof to form a spring seat portion 18 for accommodating the spaced coil springs 20 disposed between suitable seats formed on the beam member and the under side of the longitudinally disposed semi-elliptic leaf springs 22.

The ends of the semi-elliptic leaf spring 22 are provided with shoes or wear members 24, and one end 26 of said leaf spring is disposed on a seat 28 formed as part of the socket 30 adjacent one of the journal boxes. The socket 30 consists essentially of the seat portion 28, a portion of the spaced upstanding flanges 32 which extend upwardly and over the adjacent journal box 14 merging into the outer corner thereof. The socket is completed by the wall 34 connecting the flanges 32, said wall and flanges being provided with the roof 36.

The opposite end 38 of said semi-elliptic leaf spring is supported on the shelf 40 provided on the side frame adjacent the other journal box, the shelf being substantially co-planar with and similar to the seat 28 and the side frame adjacent the shelf being likewise provided with spaced flanges 42 similar to flanges 32, retaining or limiting lugs 44 being provided on the spaced flanges 42 adjacent the journal box. The flanges 42 are bossed and apertured as at 46 and provided with the retaining bolt 48 extending over a portion of the end 38 of the semi-elliptic leaf spring 22. It will thus be seen that simple yet effective retaining means is provided for the leaf spring which, while adequately retaining the leaf spring in operative position, yet readily permits removal of the leaf spring.

The leaf spring adjacent the center thereof is provided with a spring band 50 for maintaining the leaves thereof in associated relation, one to the other, and the roller seat 52 is supported on spaced seats 54 on said spring assembly, the seats preferably being aligned with the coil springs 20 whereby the weight is transmitted directly to the coil springs through the leaf springs, thus causing a pinching together of the leaves of the leaf spring 22, which increases the frictional absorption thereof. The seat 52 is provided with the spaced arms 56 embracing the spring band 50, serving to position properly the seat member 52, said arms being disposed to embrace the leaf spring inwardly and outwardly thereof. The seat member 52 is provided with the spaced roller receiving tracks or raceways 58 for the reception of the rollers 60. Upwardly extending column guides 62 are provided on the seat member 52 for the reception of the column guide cooperating portions 64 of the bolster 66. The bolster 66 is provided with the usual center bearing 68, the side bearings 70, and the brake hanger brackets 72, it being understood of course, that the side frame may be provided with end or intermediate hanger brackets, or both, such as described in Application Serial No. 593,954, Alfred E. Oelkers, filed February 19, 1932. The bolster is provided with spaced tracks 74, engaging the rollers 60, whereby the bolster is supported on the member 52, the bolster being provided with the lugs 76 and 78 for limiting lateral movement of the bolster on the bearings. It will be noted that due to the position and configuration of the tracks, the bolster is self-centering. It will also be noted that the spring seat is provided with the columns 62 cooperating with the lugs 76 and the arms 56 cooperating with the spring band 50 whereby the spring seat is interlocked with the bolster and spring 22 for the purpose of transferring lateral and longitudinal end thrust between the bolster and the wheel and axle assemblies through the side frame 12 as described.

The construction shown in Figure 4 is similar to that already described, with the exception that the spring plank or tie member 80 is provided between the side frames 10.

In the construction shown in Figures 5 and 6, it will be understood that similar construction is provided as described. With this construction no spring band 50 is used however. The leaves of the longitudinally disposed semi-elliptic leaf spring assembly 82, corresponding to the semi-elliptic leaf spring assembly 22, are crimped or interlocked adjacent the transverse center line of the truck as at 84. As before, the bolster 66 is supported on the rollers 60 which in turn are supported in tracks on the seat member 86 corresponding to the seat member 52. The seat member 86 is supported directly on the leaf spring 82 at spaced points, or along the top plane of the leaf spring assembly, in the latter case being correspondingly crimped to interlock with the leaf spring, whereby direct weight is transferred to the spaced coil springs 20.

The member 86 is provided with the columns 88 corresponding to the columns 62 and is provided with spaced brackets 90 and 92 adapted to embrace the leaves of the leaf spring 82 extending below the same; the members 90 and 92 being connected adjacent the bottom thereof with the strap 94 serving as a seat for the bolt 98. The bolt 98 is inserted through suitable aligned apertures in the members 90 and 92, the head 100 thereof being disposed outwardly of the assembly, the shank 102 being preferably rounded to accommodate itself to the crimping in the leaf spring 82 whereby the member 86 is interlocked and fixed with respect to the leaf spring 82. The inner end of the bolt 98 may be secured by suitable locking means such as the bolt 104 secured by the cotter 106. As in the embodiment disclosed in Figures 1 to 4 inclusive of the drawings, the seat member 86 is provided with the columns 88 cooperating with the lugs 76 of the bolster and has the members 90, 92 and bolt 96 cooperating with the spring assembly 82 which interlocks the seat member with the bolster and spring for the purpose of transferring lateral and longitudinal end thrust between the bolster and the wheel and axle assemblies through the side frame, as described.

It is to be understood that I do not wish to be limited by the exact embodiments of the device shown, which are merely by way of illustration and not limitation, as various and other forms of the device will of course be apparent to those skilled in the art without departing from the spirit of the invention, or the scope of the claims.

What is claimed is—

1. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf springs, a seat member supported on each of said leaf springs at a plurality of points and having positioning means embracing said spring band, a roller disposed for limited movement on each of said seat members, and a bolster mounted for lateral movement on said rollers.

2. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, a spring band on said leaf spring, a seat member supported on each of said leaf springs at a plurality of points and having positioning means embracing said spring band, a roller disposed for limited movement on each of said seat members, and a bolster mounted for lateral movement on said rollers.

3. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, retaining means for said leaf spring carried by said side frame adjacent said seat, a spring band on said leaf spring, a seat member supported on each of said leaf springs at a plurality of points and having positioning means embracing said spring band, a roller disposed for limited movement on each of said seat members, and a bolster mounted for lateral movement on said rollers.

4. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, retaining means for said leaf spring carried by said side frame adjacent said seat, coil springs supported on said side frames between said journal boxes and engaging said leaf spring, a spring band on said leaf spring, a seat member supported on each of said leaf springs at a plurality of points and having positioning means embracing said spring band, a roller disposed for limited movement on each of said seat members, and a bolster mounted for lateral movement on said rollers.

5. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf springs, a seat member supported on each of said leaf springs at a plurality of points and having positioning means embracing said spring band, securing means interlocking said spring and said seat member, a roller disposed for limited movement on each of said seat members, and a bolster mounted for lateral movement on said rollers.

6. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf spring, a seat member supported on each of said leaf springs at a plurality of points and having positioning means embracing said spring band, said seat member having columns thereon, and a bolster mounted on said seat member and having sliding cooperation with said columns.

7. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf spring, a seat member supported on each of said leaf springs at a plurality of points and having positoning means embracing said spring band, said seat member having columns thereon, a roller disposed for limited movement on each of said seat members, and a bolster mounted for lateral movement on said rollers, said bolster having sliding cooperation with said columns.

8. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf spring, a seat member supported on each of said leaf springs at a plurality of points and having positioning means embracing said spring band, securing means interlocking said spring and said seat member, said seat member having columns thereon, and a bolster mounted on said seat member and having sliding cooperation with said columns.

9. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf spring, a seat member supported on each of said leaf springs at a plurality of points and having positioning means embracing said spring band, securing means interlocking said spring and said seat member, said seat member having columns thereon, a roller disposed for limited movement on each of said seat members, and a bolster mounted for lateral movement on said rollers, said bolster having sliding cooperation with said columns.

10. In a truck, the combination of spaced side frames, said side frames including journal boxes, and a single beam member connecting said journal boxes, a spring pocket adjacent one of said journal boxes, a spring seat adjacent the other of said journal boxes, a semi-elliptic leaf spring having one end received in said pocket and the other end disposed on said seat, coil springs supported on said side frames between said journal boxes and engaging said leaf spring, a spring band on said leaf spring, a seat member supported on each of said leaf springs at a plurality of points, said points being aligned with said coil springs, and having positioning means embracing said spring band and disposed in engagement therewith, a roller disposed for limited movement on each of said seat members, and a bolster mounted for lateral movement on said rollers.

11. In a truck, the combination of spaced wheel and axle assemblies, a side frame comprising a single beam member extending therebetween, a longitudinally arranged semi-elliptic leaf spring having its ends supported by said side frame adjacent said assemblies, a seat member disposed on said spring, a load carrying member supported by said seat member, said seat member having means interlocking with said spring and said load carrying member, said side frame and spring having means cooperating to transfer longitudinal end thrust between said load carrying member and wheel and axle assemblies, and coil springs between said leaf spring and side frame.

12. In a truck, the combination of spaced wheel and axle assemblies, a side frame extending therebetween, a longitudinally arranged semi-elliptic leaf spring having its ends supported by said side frame adjacent said assemblies, a seat member disposed on said spring, and a load carrying member supported by said seat member and having means slidably cooperating with said seat member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

13. In a truck, the combination of spaced wheel and axle assemblies, a side frame extending therebetween, a longitudinally arranged semi-elliptic leaf spring having its ends supported by said side frame adjacent said assemblies, a seat member disposed on said spring and having columns thereon, and a load carrying member supported by said seat member and having sliding cooperation with said columns, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

14. In a truck, the combination of spaced wheel and axle assemblies, a side frame comprising a single beam member extending therebetween, a longitudinally arranged semi-elliptic leaf spring having its ends supported by said side frame adjacent said assemblies, a seat member disposed on said spring, a load carrying member supported by said seat member, a roller between said members to provide for lateral movement of said load carrying member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

15. In a truck, the combination of spaced wheel and axle assemblies, a side frame extending therebetween, a longitudinally arranged semi-elliptic leaf spring having its ends supported by said side frame adjacent said assemblies, a seat member disposed on said spring, a load carrying member supported by said seat member and having means sildably cooperating with said seat member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

16. In a truck, the combination of spaced wheel and axle assemblies, a side frame extending therebetween, a longitudinally arranged semi-elliptic leaf spring having its ends supported by said side frame adjacent said assemblies, a seat member disposed on said spring and having columns thereon, a load carrying member supported by said seat member and having sliding cooperation with said columns, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

17. In a truck, the combination of spaced wheel and axle assemblies, a side frame comprising a single beam member extending therebetween, a longitudinally arranged semi-elliptic leaf spring having its ends supported by said side frame adjacent said assemblies, a spring band on said leaf spring, a seat member on said leaf spring and having positioning means embracing said spring band, and a load carrying member supported by said seat member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

18. In a truck, the combination of spaced wheel and axle assemblies, a side frame comprising a singe beam member extending therebetween, a longitudinally arranged semi-elliptic leaf spring having its ends supported by said side frame adjacent said assemblies, a spring band on said leaf spring, a seat member on said leaf spring and having positioning means embracing said spring band, and a load carrying member supported by said seat member and having lateral motion relative thereto, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

19. In a truck, the combination of spaced wheel and axle assemblies, a side frame comprising a single beam member extending therebetween, a longitudinally arranged semi-elliptic leaf spring having its ends supported by said side frame adjacent said assemblies, a spring band on said leaf spring, a seat member on said leaf spring and having positioning means embracing said spring band, a load carrying member supported by said seat member, and a roller between said seat and load carrying member to provide for lateral movement of said load carrying member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

20. In a truck, the combination of spaced wheel and axle assemblies, a side frame extending therebetween, a longitudinally arranged semi-elliptic leaf spring having its ends supported by said side frame adjacent said assemblies, a spring band on said leaf spring, a seat member on said leaf spring and having positioned means embracing said spring band, said seat member having columns thereon, and a load carrying member supported by said seat member and having sliding cooperation with said columns, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

21. In a truck, the combination of spaced wheel and axle assemblies, a side frame extending therebetween, a longitudinally arranged semi-elliptic leaf spring having its ends supported by said side frame adjacent said assemblies, a spring band on said leaf spring, a seat member on said leaf spring and having positioning means embracing said spring band, said seat member having columns thereon, a load carrying member supported by said seat member and having sliding cooperation with said columns, and a roller between said seat and load carrying member to provide for lateral movement of said load carrying member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies.

22. In a truck, the combination of spaced wheel and axle assemblies, a side frame comprising a single beam member extending therebetween, a longitudinally arranged semi-elliptic leaf spring having its ends supported by said side frame adjacent said assemblies, a spring band on said leaf spring, a seat member on said leaf spring and having positioning means embracing said spring band, a load carrying member supported by said seat member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

23. In a truck, the combination of spaced wheel and axle assemblies, a side frame comprising a single beam member extending therebetween, a longitudinally arranged semi-elliptic leaf spring having its ends supported by said side frame adjacent said assemblies, a spring band on said leaf spring, a seat member on said leaf spring and having positioning means embracing said spring band, a load carrying member supported by said seat member and having lateral motion relative thereto, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

24. In a truck, the combination of spaced wheel and axle assemblies, a side frame comprising a single beam member extending therebetween, a longitudinally arranged semi-elliptic leaf spring having its ends supported by said side frame adjacent said assemblies, a spring band on said leaf spring, a seat member on said leaf spring and having positioning means embracing said spring band, a load carrying member supported by said seat member, a roller between said seat and load carrying member to provide for lateral movement of said load carrying member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

25. In a truck, the combination of spaced wheel and axle assemblies, a side frame extending therebetween, a longitudinally arranged semi-elliptic leaf spring having its ends supported by said side frame adjacent said assemblies, a spring band on said leaf spring, a seat member on said leaf spring and having positioning means embracing said spring band, said seat member having columns thereon, a load carrying member supported by said seat member and having sliding cooperation with said columns, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

26. In a truck, the combination of spaced wheel and axle assemblies, a side frame extending therebetween, a longitudinally arranged semi-elliptic leaf spring having its ends supported by said side frame adjacent said assemblies, a spring band on said leaf spring, a seat member on said leaf spring and having positioning means embracing said spring band, said seat member having columns thereon, a load carrying member supported by said seat member and having sliding cooperation with said columns, a roller between said seat and load carrying member to provide for lateral movement of said load carrying member, said seat member having means interlocking with said spring and said load carrying member for transfer of lateral and longitudinal end thrust, said side frame and spring having means cooperating with said interlocking means to transfer said lateral and longitudinal end thrust between said load carrying member and wheel and axle assemblies, and coil springs between said leaf spring and side frame.

27. In a truck, the combination of spaced wheel and axle assemblies, a side frame comprising a single beam member extending therebetween, a longitudinally arranged semi-elliptic leaf spring having its ends supported by said side frame adjacent said assemblies, a seat member disposed on said spring, and a load carrying member supported by said seat member, said seat member having means interlocking with said spring and said load carrying member, said side frame and spring having means cooperating to transfer longitudinal end thrust between said load carrying member and wheel and axle assemblies.

FRITZ B. ERNST.

CERTIFICATE OF CORRECTION.

Patent No. 2,051,595.　　　　　　　　　　　　　　　August 18, 1936.

FRITZ B. ERNST.

It is hereby certified that error appears in the printed specification of the above numbered patent requiring correction as follows: Page 2, second column, line 21, for "Alfred E. Oelkers" read Alfred H. Oelkers; page 4, second column, line 39, claim 15, for "sildably" read slidably; page 5, first column, line 10, claim 18, for "singe" read single; line 52, claim 20, for "positioned" read positioning; and that the said Letters Patent should be read with these corrections therein that the same may conform to the record of the case in the Patent Office.

Signed and sealed this 3rd day of November, A. D. 1936.

(Seal)

Henry Van Arsdale
Acting Commissioner of Patents.